(12) United States Patent
Rohrbach et al.

(10) Patent No.: US 10,591,956 B2
(45) Date of Patent: Mar. 17, 2020

(54) FOLDABLE CASE FOR USE WITH AN ELECTRONIC DEVICE

(71) Applicant: Apple Inc., Cupertino, CA (US)

(72) Inventors: Matthew D. Rohrbach, San Francisco, CA (US); Vinh Diep, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 15/694,094

(22) Filed: Sep. 1, 2017

(65) Prior Publication Data

US 2018/0024591 A1 Jan. 25, 2018

Related U.S. Application Data

(63) Continuation of application No. 14/167,600, filed on Jan. 29, 2014, now Pat. No. 9,760,118, which is a
(Continued)

(51) Int. Cl.
*G06F 1/16* (2006.01)
*A45C 9/00* (2006.01)
(Continued)

(52) U.S. Cl.
CPC .............. *G06F 1/1633* (2013.01); *A45C 9/00* (2013.01); *A45C 11/00* (2013.01); *A45C 13/02* (2013.01);
(Continued)

(58) Field of Classification Search
CPC ................. G06F 1/1628; G06F 1/1633; G06F 2200/1633; B65D 85/64; B65D 5/5206;
(Continued)

(56) References Cited

U.S. PATENT DOCUMENTS 1,347,839 A    7/1920   Coons
1,939,824 A   12/1933   Mix et al.
(Continued)

FOREIGN PATENT DOCUMENTS

EP        1841082     10/2007
FR    2689734 A1   10/1993
(Continued)

OTHER PUBLICATIONS

European Patent Application No. 10754612.9—Examination Report dated Oct. 16, 2017.
(Continued)

*Primary Examiner* — Rafael A Ortiz
(74) *Attorney, Agent, or Firm* — Dickinson Wright RLLP

(57) ABSTRACT

This is directed to a case for securing and protecting an electronic device. The case can include a cover connected to a pouch by a hinge such that the cover can be overlaid over a device interface (e.g., a device display). The case can be constructed by layering and combining several types of materials, including for example materials having resistant outer surfaces, materials limiting the deformation of the case, materials providing a soft surface to be placed in contact with the device, and rigid materials for defining a structure of the case. In some embodiments, the case can include a tab that allows a user to fold open the cover of the case to form a triangular prism. The prism can be placed on any of its surfaces such that the device can be oriented towards a user at particular angles (e.g., a typing-specific orientation and a media playback orientation).

18 Claims, 9 Drawing Sheets

Related U.S. Application Data continuation of application No. 12/683,328, filed on Jan. 6, 2010, now Pat. No. 8,672,126.

(51) Int. Cl.

| | | |
|---|---|---|
| *A45C 13/02* | (2006.01) | |
| *A45C 11/00* | (2006.01) | |
| A45C 3/02 | (2006.01) | |
| A45C 7/00 | (2006.01) | |

(52) U.S. Cl.
CPC .............. *G06F 1/1628* (2013.01); *A45C 3/02* (2013.01); *A45C 7/00* (2013.01); *A45C 2011/003* (2013.01); *A45C 2013/025* (2013.01); *A45C 2200/15* (2013.01); *G06F 2200/1633* (2013.01); *Y10T 29/49826* (2015.01)

(58) Field of Classification Search
CPC ......... H04B 1/3888; A45C 9/00; A45C 11/00; A45C 13/02; A45C 2011/003; A45C 2013/025; A45C 2200/15
USPC .... 206/320, 748, 45.24, 45.2; 383/109, 116, 383/117; 455/575.1, 575.8
See application file for complete search history.

(56) References Cited

U.S. PATENT DOCUMENTS

| | | | |
|---|---|---|---|
| 4,259,568 | A | 3/1981 | Dynesen |
| 4,703,161 | A | 10/1987 | Mclean |
| 5,377,794 | A | 1/1995 | Book |
| 5,555,614 | A | 9/1996 | Book |
| 5,887,723 | A | 3/1999 | Myles et al. |
| 5,996,778 | A | 12/1999 | Shih |
| 6,145,661 | A | 11/2000 | Jung |
| 6,264,029 | B1 | 7/2001 | Motson |
| 6,347,796 | B1 | 2/2002 | Grossman et al. |
| 6,697,045 | B2 | 2/2004 | Min |
| 6,729,518 | B2 | 5/2004 | Badillo et al. |
| 6,772,879 | B1 | 8/2004 | Domotor |
| 6,781,522 | B2 | 8/2004 | Sleva et al. |
| 6,925,739 | B1 | 8/2005 | Cole et al. |
| 7,036,642 | B2 | 5/2006 | Hoberman et al. |
| 7,293,635 | B2 * | 11/2007 | Repke ...................... A45C 3/06 190/109 |
| 7,561,415 | B2 | 7/2009 | Liou et al. |
| 7,588,146 | B1 | 9/2009 | Salander et al. |
| 7,673,745 | B2 | 3/2010 | Sirichai et al. |
| 8,225,829 | B2 | 7/2012 | Melamed |
| 8,672,126 | B2 | 3/2014 | Rohrbach et al. |
| 2002/0134828 | A1 | 9/2002 | Sandbach et al. |
| 2004/0134812 | A1* | 7/2004 | Yeh .......................... A45C 5/03 206/320 |
| 2005/0098594 | A1 | 5/2005 | Truong |
| 2005/0258057 | A1* | 11/2005 | Gelphman .............. A45C 13/02 206/320 |
| 2006/0060476 | A1 | 3/2006 | Lau |
| 2007/0228099 | A1 | 10/2007 | Beda |
| 2008/0017678 | A1 | 1/2008 | Anderson et al. |
| 2008/0164174 | A1 | 7/2008 | Chan et al. |
| 2008/0302687 | A1 | 12/2008 | Sirichai et al. |
| 2009/0166139 | A1 | 7/2009 | Cleary |
| 2014/0183068 | A1 | 7/2014 | Rohrbach et al. |

FOREIGN PATENT DOCUMENTS

| | | | |
|---|---|---|---|
| JP | H04226606 | A | 8/1992 |
| JP | H0653133 | U | 7/1994 |
| JP | H09507765 | A | 8/1997 |
| JP | H10308595 | A | 11/1998 |
| JP | H11028114 | A | 2/1999 |
| JP | 2002000328 | A | 1/2002 |
| JP | 2006283221 | A | 10/2006 |
| JP | 2007127980 | A | 5/2007 |
| JP | 2007176109 | A | 7/2007 |
| JP | 2007282702 | A | 11/2007 |
| JP | 2008178494 | A | 8/2008 |
| JP | 2008279700 | A | 11/2008 |
| JP | 2009127980 | A | 6/2009 |
| JP | 2009178373 | A | 8/2009 |
| KR | 1020090003315 | | 4/2009 |
| WO | 9514401 | A1 | 6/1995 |

OTHER PUBLICATIONS

Japanese Patent Application No. 2012-547995—Office Action dated Feb. 5, 2014.
UK Patent Application No. GB1522679.8—Combined Search and Examination Report under Sections 17 and 18(3) dated Jan. 12, 2016.
Japanese Patent Application No. 2015-132457—Office Action dated Apr. 20, 2016.
UK Patent Application No. GB1522679.8—Examination Report under Section 18(3) dated Mar. 30, 2016.
Australian Patent Application No. 2014203693—Patent Examination Report No. 1 dated Jun. 19, 2015.
Chinese Application for Invention No. 201410083884.1—Notification of the First Office Action dated Mar. 25, 2015.
European Patent Application No. 10754612.9—Communication pursuant to Article 94(3) dated Jun. 30, 2015.
UK Patent Application No. 1213621.4—Examination Report under Section 18(3) dated Jun. 12, 2015.
Japanese Patent Application No. 2012-547995—Office Action dated Nov. 4, 2014.
Australian Patent Application No. 2010340300—Patent Examination Report No. 1 dated Jul. 8, 2013.
Australian Patent Application No. 2014203693—Patent Examination Report No. 2 dated Oct. 15, 2015.
UK Patent Application No. 1213621.4—Examination Report under Section 18(3) dated Oct. 28, 2015.
Australian patent application No. 2010340300—Notice of Allowance dated May 5, 2012.
Chinese Application for Invention No. 201410083884.1—Notification of the Second Office Action dated Nov. 27, 2015.
UK Patent Application No. GB1522679.8—Examination Report under Section 18(3) dated May 19, 2016.
Chinese Application for Invention No. 201410083884.1—Notification of the Third Office Action dated May 16, 2016.
Japanese Patent Application No. 2012-547995—Office Action dated Oct. 9, 2013.
Japanese Patent Application No. 2015-132457—Office Action dated Dec. 14, 2016.
UK Patent Application No. GB1522679.8—Examination Report under Sections 18(3) dated Jul. 21, 2016.
Korean Patent Application No. 10-2012-7020812—Notice of Preliminary Rejection dated Jul. 19, 2016.
PCT Patent Application No. PCT/US2010/046815—International Report on Patentability and Written Opinion dated Apr. 24, 2012.
PCT Patent Application No. PCT/US2010/046815—International Report on Patentability and Written Opinion dated Nov. 25, 2010.
Chinese Application for Invention No. 201080001378.3—Office Action dated Feb. 26, 2013.
Chinese Application for Invention No. 201410083884.1—Final Office Action dated Feb. 14, 2017.
Korean Patent Application No. 10-2012-7020812—Preliminary Rejection dated Mar. 30, 2017.
Japanese Patent Application No. 2015-132457—Pre-Appeal Review Report dated Jul. 12, 2017.

* cited by examiner

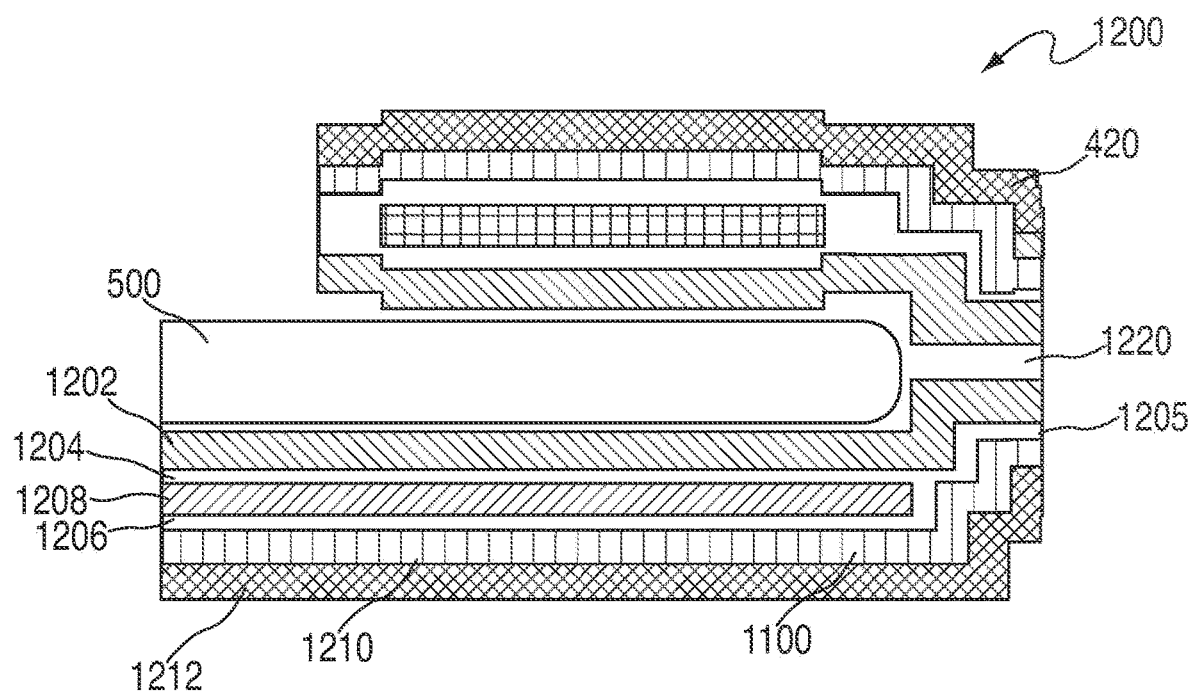
FIG. 12
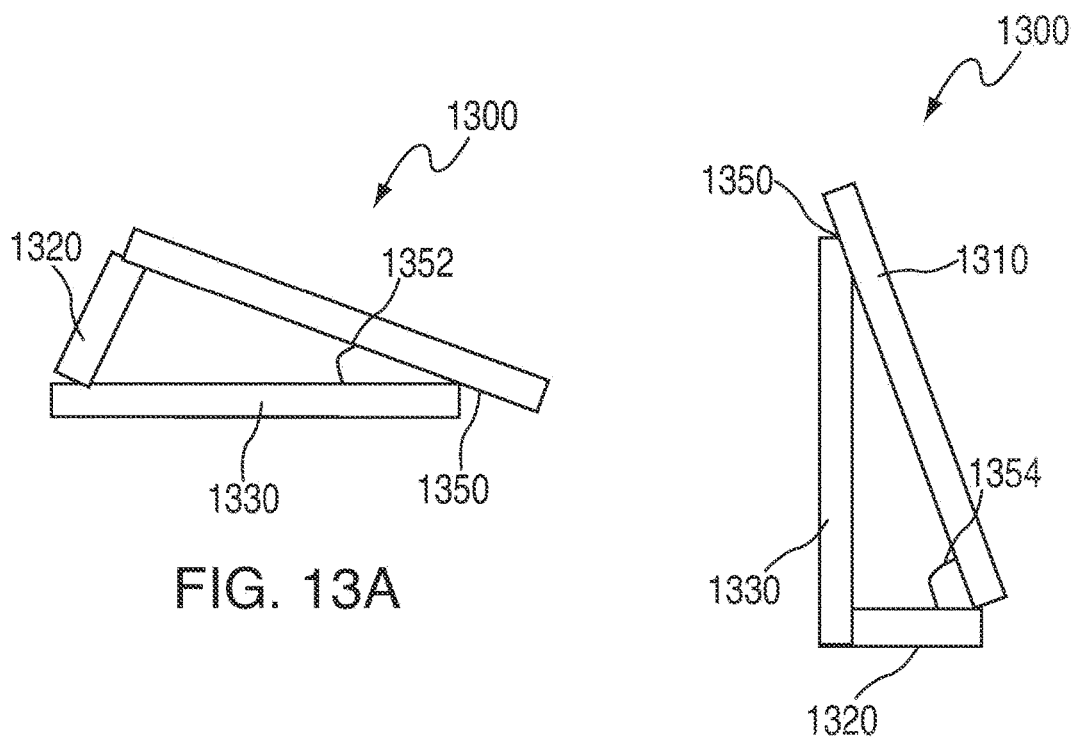
FIG. 13A
FIG. 13B

FOLDABLE CASE FOR USE WITH AN ELECTRONIC DEVICE

CROSS-REFERENCE TO RELATED APPLICATIONS

This Application is a continuation of U.S. application Ser. No. 14/167,600, filed Jan. 29, 2014, entitled "FOLDABLE CASE FOR USE WITH AN ELECTRONIC DEVICE," now U.S. Pat. No. 9,760,118 issued Sep. 12, 2017, which is a continuation of U.S. application Ser. No. 12/683,328 filed Jan. 6, 2010, entitled "FOLDABLE CASE FOR USE WITH AN ELECTRONIC DEVICE," now U.S. Pat. No. 8,672,126 issued Mar. 18, 2014, the contents of which are incorporated by reference herein in their entirety for all purposes.

BACKGROUND

This is directed to a case for protecting an electronic device. In particular, this is directed to a case having a foldable flap for selectively covering a display of the device, and for creating a stand supporting the device in a particular orientation.

A portable electronic device can include several interfaces through which a user can interact with the device. In particular, a device can include one or more displays and input interfaces via which the user can consume displayed content or control the manner in which content is displayed. The device can include an outer shell supporting the several interfaces and defining a volume into which electronic device components can be placed and supported. For example, the outer shell can be used to retain a power supply (e.g., a battery), processing circuitry, communications circuitry, positioning circuitry, storage and memory, and electrically conductive paths (e.g., a bus) connecting the device components.

The outer shell can be constructed from one or more distinct components. For example, the outer shell can include a housing having one or more components, a bezel placed around the periphery of the housing, and a display. The housing can include a back plate and sidewalls extending from the back plate that the bezel can engage. The bezel can include one or more features for engaging and retaining the window within the bezel periphery.

During use, the device outer shell can be exposed to impacts or to the environment around the device. Because impacts can damage the outer shell or damage components within the device, a user may wish to protect an electronic device by placing the device in a protective case. The protective case can be constructed from any suitable soft or hard material, and can protect some or all of the electronic device. For example, the case can cover the housing and bezel and only part of the display. As another example, the case can substantially the entirety of the electronic device such that the device can be removed from the case during use. As still another example, the case can selectively cover the display (e.g., with a cover). The cases, however, may have limited aesthetic appeal or may have limitations in the manner in which they protect the device.

SUMMARY

This is directed to a case for use with a portable electronic device having a display. In particular, this is directed to a case having a pouch into which an electronic device can be placed, and a cover that can fold over the pouch to selectively protect the device display.

To protect an electronic device display, the case can include a pouch element coupled to a cover element by a hinge. The pouch element can provide a protective surface around at least some of the electronic device. For example, the pouch can protect one surface and the sidewalls of the device, leaving only the display window exposed. The hinge and cover can be sized such that the cover can be folded over the pouch to substantially entirely cover the exposed display window.

The case can be constructed from any suitable material. In some embodiments, the case can be constructed by combining several different materials having different properties. For example, several different materials can be layered to form the case. The materials can include, for example, polyester microfiber, polycarbonate fiber, polyurethane adhesive, polyester knit, and polyurethane sheets. The different materials can be layered in different orders, and can include only some of the materials based on the section of the case. For example, portions of the cover can include fiberglass plates, but portions of the pouch can include only softer layers (e.g., polyurethane and microfiber).

The case can include one or more tabs for holding the case at an angle relative to the ground. For example, a back surface of the case can include a tab into which the cover can be folded. As the cover is folded into the tab, the case can define a triangular shape that can be disposed on any of the three sides of the triangle. In some embodiments, the length of the sides of the triangle can be selected to provide different viewing angles for the device within the case (e.g., a typing angle and a media playback angle).

BRIEF DESCRIPTION OF THE DRAWINGS

The above and other features of the present invention, its nature and various advantages will be more apparent upon consideration of the following detailed description, taken in conjunction with the accompanying drawings in which:

FIG. 12 is a cross-sectional view of base layer stack 1110 taken along line 12-12 and connected to a peripheral layer stack in accordance with one embodiment of the invention;

FIGS. 13A and 13B are end views of a folded over case defining a prism in accordance with one embodiment of the invention;

DETAILED DESCRIPTION

An electronic device can include an external shell in which different components can be secured to provide electronic device functionality. The external shell can include one or more interfaces for interacting with the device, including for example, one or more displays and input mechanisms. As another example, the external shell can include one or more ports or connectors, or openings for the ports or connectors (e.g., USB, power and audio connectors). As still another example, the external shell can include an opening for a speaker. To protect the external shell from impacts or other external forces applied to the device, the device can be placed within a case.

The case can have any suitable shape suitable for protecting at least a portion of the electronic device. In some embodiments, the case can include a primary pouch for receiving the electronic device. The pouch can include an opening through which one or more of a display and an input interface can be accessible. In some embodiments, the opening can include a transparent film or layer through which the interface can be accessed (e.g., an interface through which a touch interface can be operated). To protect the display and interface through the opening, the case can include a cover connected to the pouch by a hinge, such that the cover can be folded over the pouch opening.

The case can be constructed from any suitable material to provide a particular aesthetic finish or desired level of protection. For example, the case can be constructed from a hard material. As another example, the case can be constructed from a softer material, but include one or more hard elements to provide resistance to impacts. In one implementation, the case can be constructed by layering different types of material to form a stack. The material stack can include different types of materials, including materials selected based on different physical properties. For example, the material stack can include a soft material (e.g., to be placed in contact with the device, a hard material (e.g., fiberglass) to withstand impacts, and a stain-resistant or water-resistant material (e.g., polyurethane) to provide a pleasing outer surface for the case.

The case can include a tab embedded or attached to the back surface of the pouch such that the cover can be folded back along the hinge and secured with in the tab. This can define a triangular prism, where the cover, hinge and pouch of the case define the three rectangular sides of the prism. The tab can be positioned on the pouch such that the length of the hinge and the length of the cover provide two different angles at which the case can be positioned. For example, the angles can be selected to optimize a typing angle and a viewing angle for the device.

Figure 1:
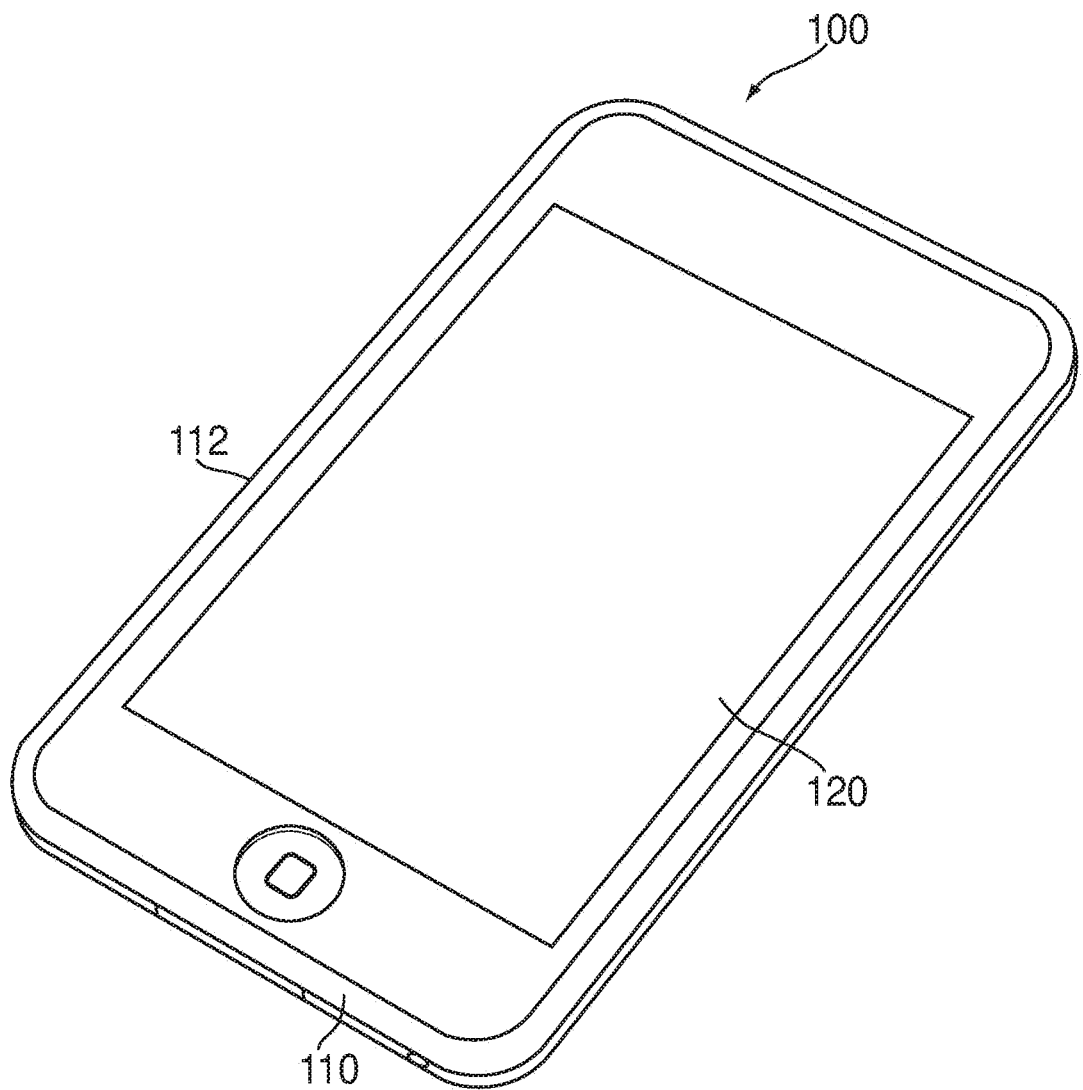
FIG. 1 is a schematic view of an illustrative electronic device in accordance with one embodiment of the invention.
Figure 2A:
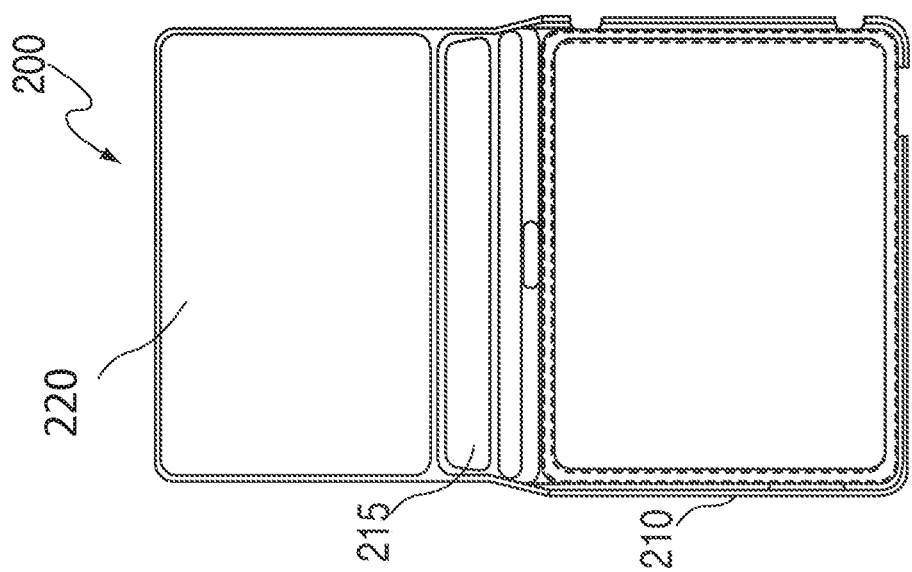
FIGS. 2A-C are a series of schematic views of an illustrative case in accordance with one embodiment of the invention.
Figure 2B:
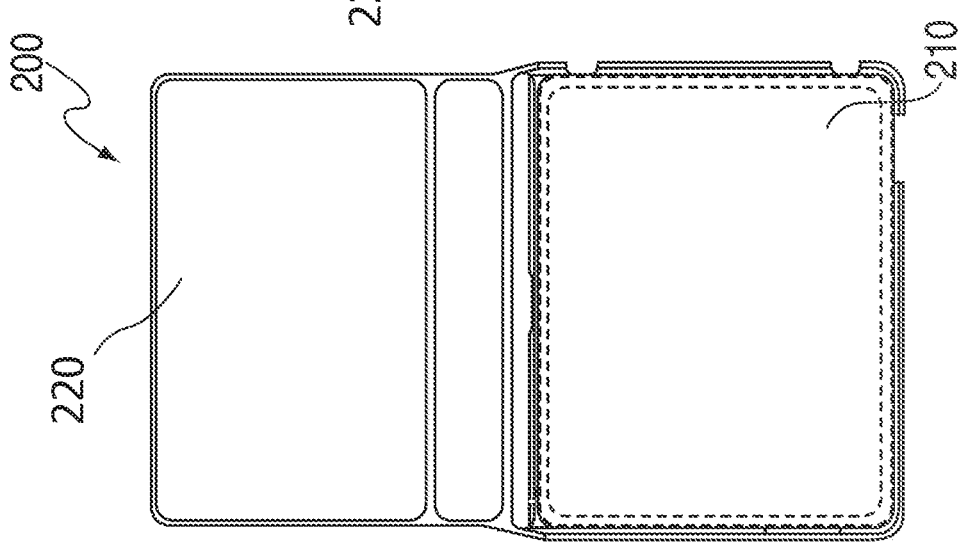
Figure 2C:
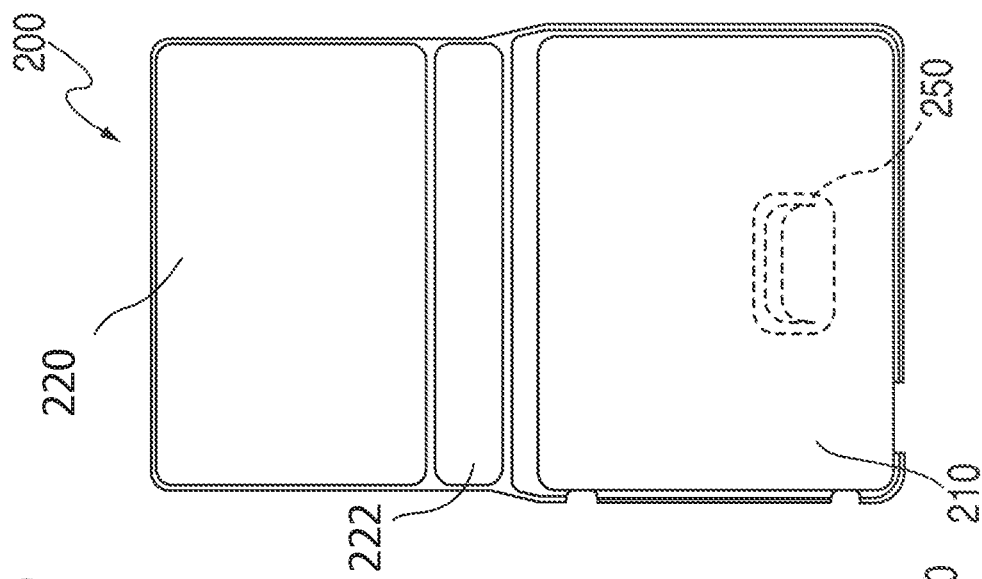
Figure 3C:
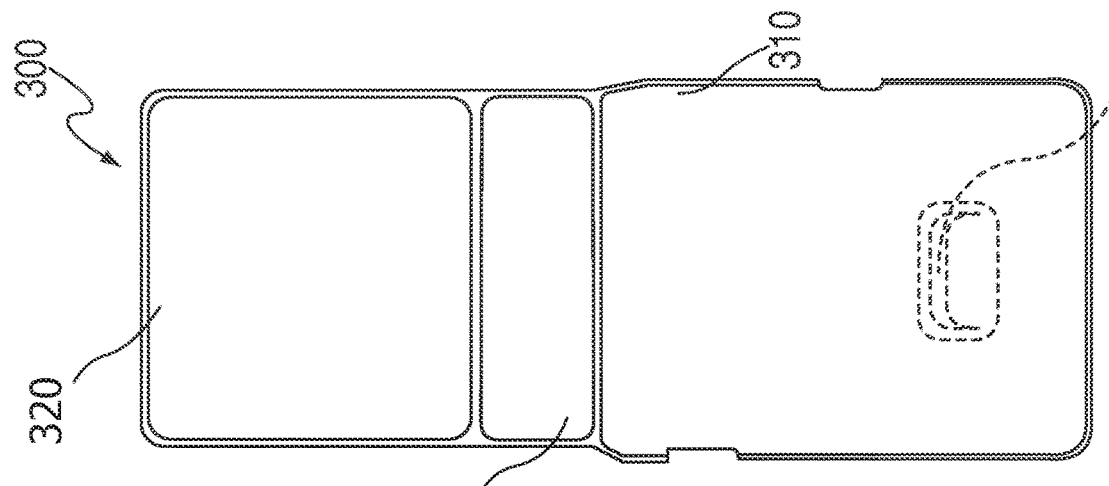
FIGS. 3A-C are a series of schematic views of an illustrative case in accordance with one embodiment of the invention.
Figure 3B:
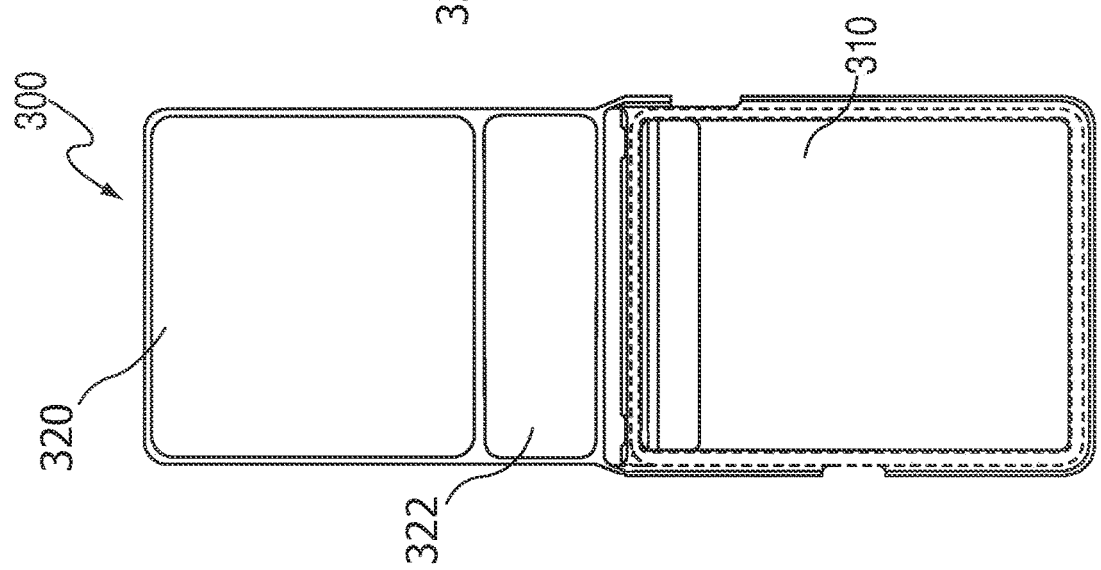
Figure 3A:
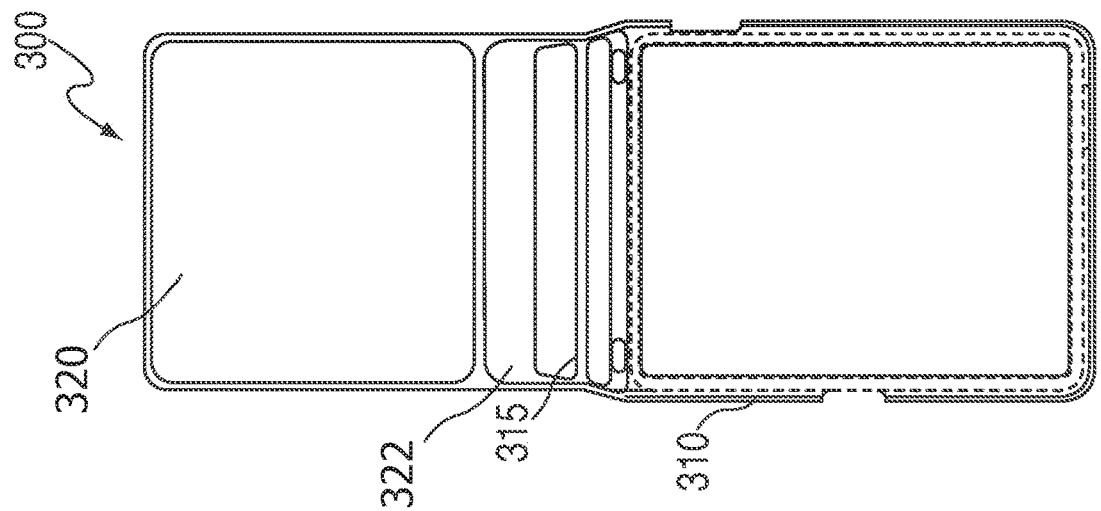

Any suitable electronic device can be placed within the case. FIG. 1 is a schematic view of an electronic device in accordance with one embodiment of the invention. Electronic device 100 can include housing 110, bezel 112, and window 120. Bezel 112 can be coupled to housing 110 in a manner to secure window 120 to the bezel. Housing 110 and bezel 112 can be constructed from any suitable material, including for example plastic, metal, or a composite material. In one implementation, housing 110 can be constructed from plastic or aluminum, and bezel 112 can be constructed from stainless steel. Window 120 can be constructed from any suitable transparent or translucent material, including for example glass or plastic. Different electronic device components can be retained within electronic device 100 to provide different functionality to the user.

To protect the electronic device from damage caused by impacts or to wear and tear caused by the environment, the electronic device can be placed in a case. FIGS. 2A-C and FIGS. 3A-C are a series of schematic views of an illustrative case in accordance with one embodiment of the invention. Cases 200 and 300 can be operative to receive an electronic device, for example within pouch elements 210 and 310, respectively. The pouch elements can include an opening through which a display can be viewed (e.g., described in more detail below). To protect the display, cases 200 and 300 can include covers 220 and 320, respectively, connected to the pouch elements via hinges 222 and 322, respectively. The hinges 222 and 322 can be constructed from a pliable material such that covers 220 and 320 can bend towards or away from the opening of pouches 210 and 310 (e.g., over the display to protect the device display when stored, or behind the pouch exposing the display when the device is in use.

Cases 200 and 300 can include flap 215 assembled into or coupled to an opening in pouches 210 and 310, respectively, into which the device can be inserted. Flaps 215 and 315 can extend away from the openings such that the flaps can be folded over the device and retain the device within the pouch. In some embodiments, flaps 215 and 315 can include one or more rigid elements for assisting a user in folding the flap over the device, or for maintaining the flap between the device and the pouch surface.

In some embodiments, a user may wish to fold covers 220 and 320 behind pouch elements 210 and 310, respectively, so as to define other surfaces on which the case may rest. For example, a user can fold covers 220 and 320 into tabs 250 and 350, respectively, such that cases 200 and 300 form prisms, where each of pouch elements 210 and 310, hinges 222 and 322, and covers 220 and 320 define side walls of the prism. The covers can be placed on any of the sidewalls of the prism (e.g., resting on the hinge or on the cover) such that the device display within the pouch is angled to the user at a particular angle. In some embodiments, the position of tabs 250 and 350, and the length of hinges 222 and 322, and covers 220 and 320 can be selected such that the device is displayed at a particular angle when cases 200 and 300 rest on hinges 222 and 322, and covers 220 and 320.

Cases 200 and 300 can be oriented in any suitable manner. In the examples of FIGS. 2A-C and FIGS. 3A-C, cases 200 and 300 are oriented in landscape and portrait modes, respectively. For example, hinge 222 is along the long end of rectangular pouch element 210, while hinge 322 is along the short end of rectangular pouch element 310. It will be understood, however, that the pouch element can have any suitable shape, and that the hinge can be along one or more of any of the sides of the pouch element (e.g., a hinge along two non-adjacent or non-continuous edges of a multi-sided polygon. For the sake of simplicity, however, the following discussion will provide examples and details in the context of the landscape-oriented cases (e.g., case 200).

Figure 4:
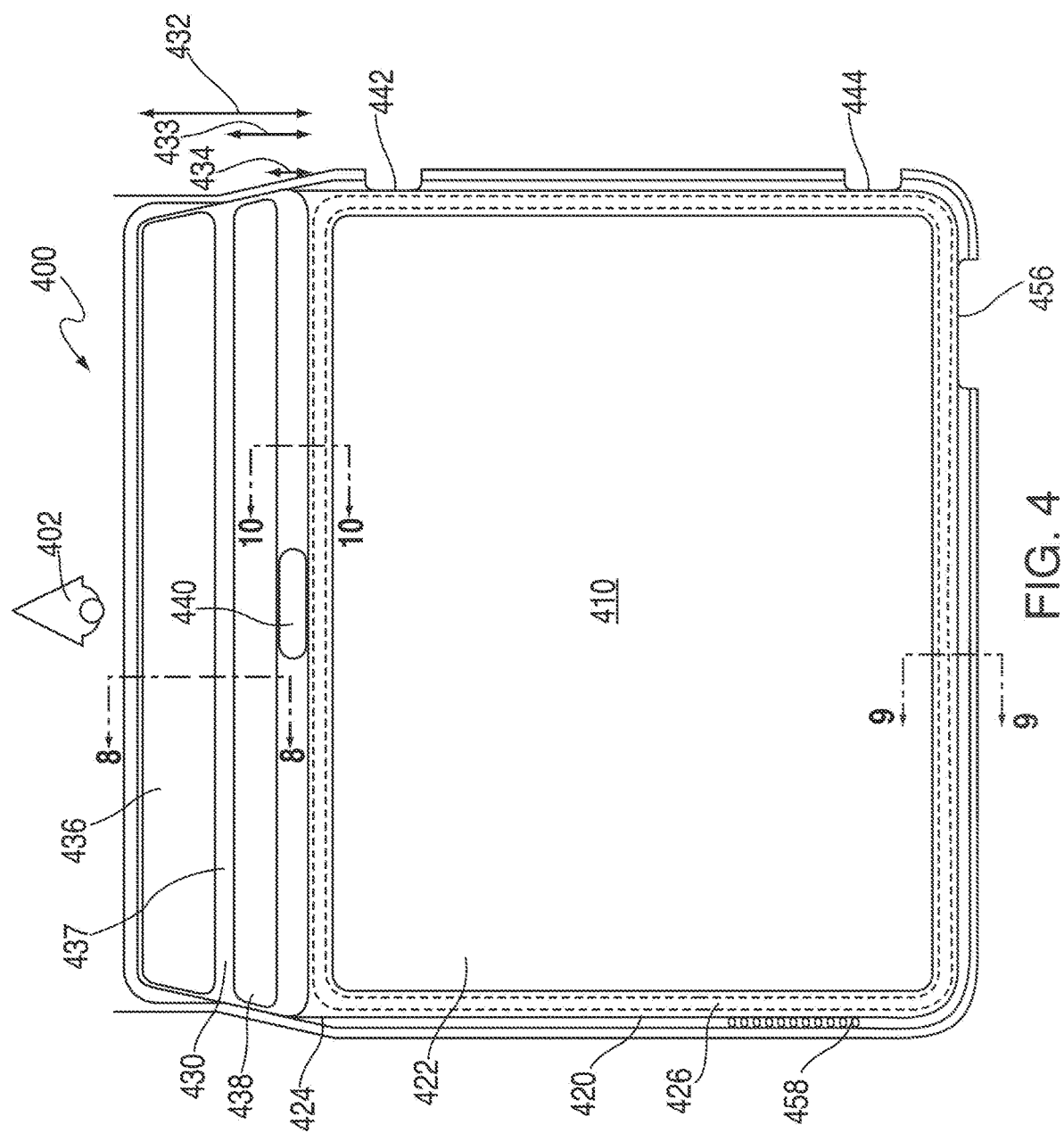
FIG. 4 is a schematic view of an illustrative pouch used in a case for retaining an electronic device in accordance with one embodiment of the invention.

FIG. 4 is a schematic view of an illustrative pouch used in a case for retaining an electronic device in accordance with one embodiment of the invention. Pouch element 400 can include a back layer or primary stack 410 to which a periphery or secondary stack 420 can be coupled. Periphery stack 420 can be positioned around the periphery of back layer stack 410 such that when an electronic device is inserted within pouch 400, the periphery of the device is constrained between stacks 410 and 420. The width of periphery stack 420 can be selected based on any suitable criteria, including for example the size of the device to be placed within the pouch. In particular, periphery stack 420 can be sized such that an electronic device cannot pass through an opening of the periphery stack (e.g., opening 422, described below) once it has been inserted in the pouch. Periphery stack 420 can include opening 422 through which the electronic device can be visible and manipulated. For example, opening 422 can be substantially sized to match the size of a display area or window of the device. As another example, opening 422 can be sized such that a display and an input interface (e.g., a keyboard) are visible and accessible through the opening.

Figure 5:
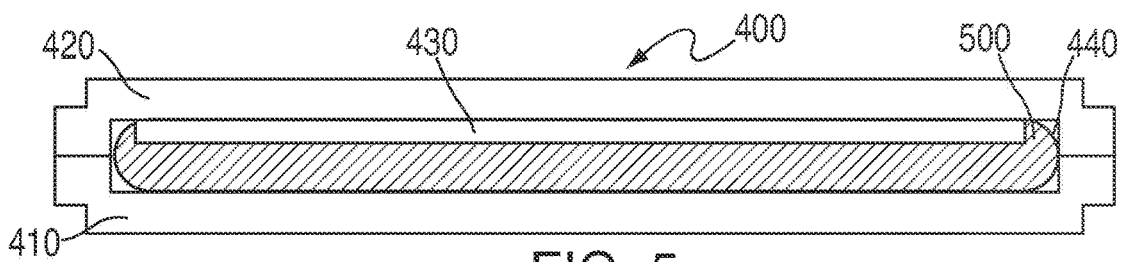
FIG. 5 is an end view of the pouch of FIG. 4 taken from viewpoint 402 in accordance with one embodiment of the invention.
Figure 6:
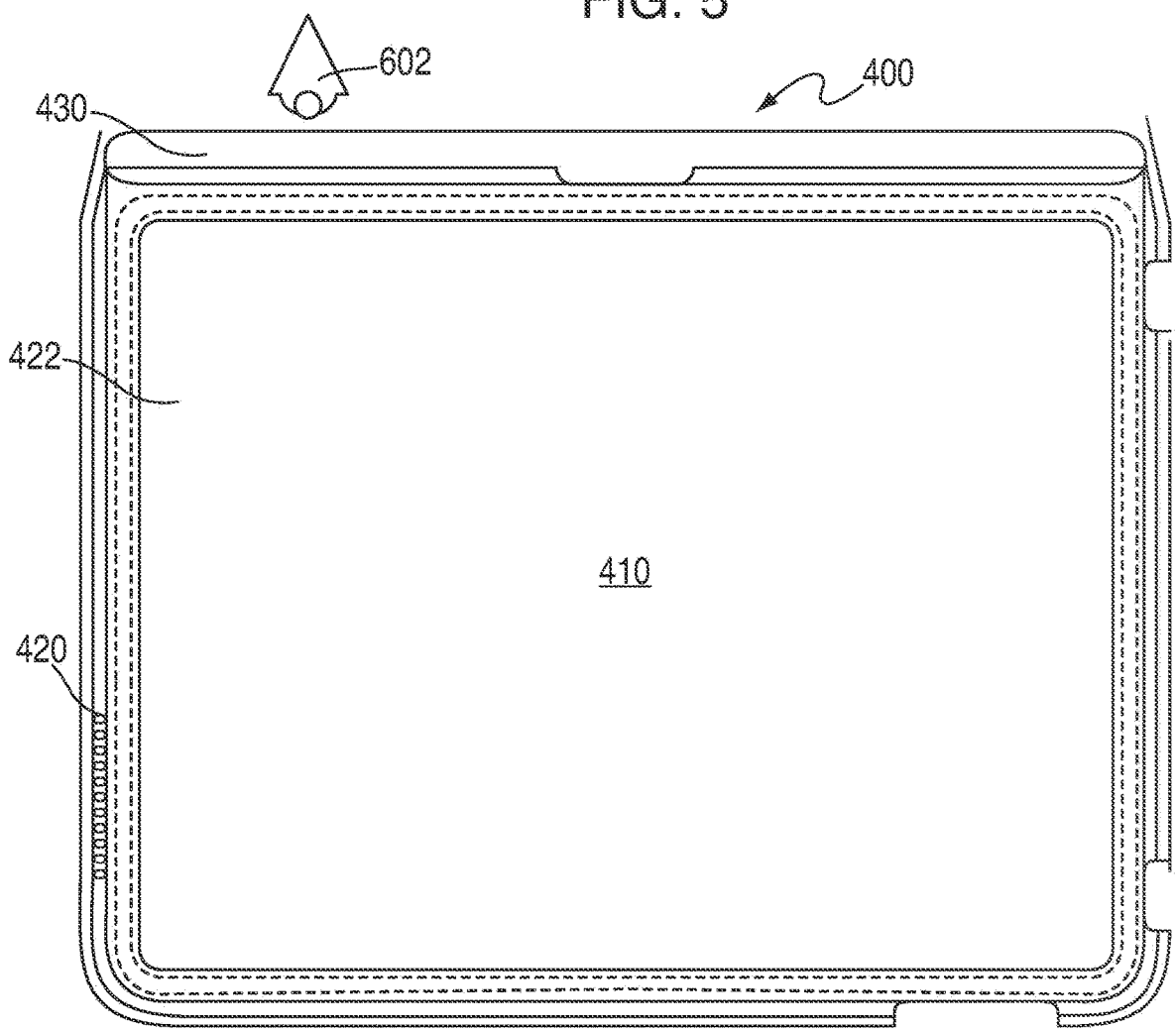
FIG. 6 is a schematic view of the pouch of FIG. 4 in which the flap has been folded over a device in accordance with one embodiment of the invention.
Figure 7:
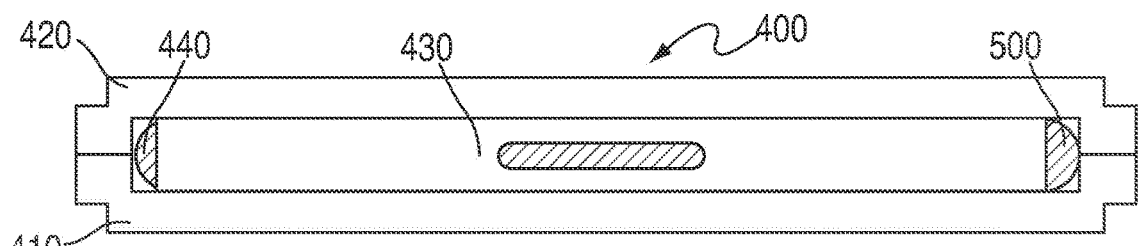
FIG. 7 is an end view of the pouch of FIG. 6 taken from viewpoint 402 in accordance with one embodiment of the invention.

An electronic device can be placed within pouch 400 (e.g., between stacks 410 and 420) using any suitable approach. In some embodiments, the pouch can include an opening through which the device can be slid into the pouch. This may be necessary if opening 422 is sized such that the device cannot pass through the opening (e.g., for insertion or removal). FIG. 5 is an end view of the pouch of FIG. 4 taken from viewpoint 402 in accordance with one embodiment of the invention. As shown in FIG. 5, pouch 400 can include opening 440 through which device 500 can be inserted. To secure the electronic device between stacks 410 and 420, flap 430 can be coupled with or embedded within one of the stacks (e.g., stack 420). Flap 430 can extend out of periphery stack 420 and away from opening 422 such that flap 430 can be folded towards stack 410 and define a sidewall between stacks 410 and 420. FIG. 6 is a schematic view of the pouch of FIG. 4 in which the flap has been folded over a device in accordance with one embodiment of the invention. As shown in FIG. 6, flap 430 has been folded within opening 440 and towards stack 410 of pouch 400. FIG. 7 is an end view of the pouch of FIG. 6 taken from viewpoint 402 in accordance with one embodiment of the invention. As shown in FIG. 7, flap 450 can around device 500 such that the free end of flap 430 is between device 500 and stack 410. This can allow flap 430 to form a sidewall for pouch 400, and thus secure device 500 on all sides (flap 430 on one side, and the interface between stacks 410 and 420 on the other sides).

Returning, to FIG. 4, flap 430 can have any suitable width 432 adequate for securing the electronic device once flap 430 has been folded beneath the device. In particular, width 432 can be selected such that width 432 is substantially larger than height 434 of device 500. The length of width 432 less height 434 can be selected such that it provides sufficient resistance (e.g., from friction between flap 430 and stack 410 to prevent flap 430 from slipping out). To enhance a user's ease in inserting flap 430 around device 500, flap 430 can include one or more rigid elements 436 and 438, also referred to as a first element and a second element, respectively, separated by flexible portion 437. In some embodiments, flexible portion 437 can be the same as the non-rigid portions of flap 430 (e.g., rigid elements 436 and 438 are created from the introduction of addition materials within flap 430). The width of rigid element 436, as well as the position of rigid element 436 relative to the border of flap 430 and stack 420 can be selected such that a user can easily fold rigid element 436 over a device and into pouch 400. In particular, the width of rigid element 436 can be no more than the distance 433 between rigid element 436 and stack 420 (e.g., the smallest distance between portions of rigid element 436 and stack 420). In other words, flexible portion 437 can extend to distance 433.

Because the height of the device (e.g., height 434) is less than distance 433 between rigid element 438 and stack 420, flap 430 can include an additional section that a user may wish to insert between device 500 and stack 410 to ensure that device 500 remains secured within pouch 400 (e.g., so that only an amount of flap 430 equal to height 434 is not between the device and the back layer stack). Rigid element 438 can substantially be placed within this portion to provide a hard component that a user can easily slide into pouch 400. Rigid element 438 can have any suitable size, including for example a width of no more than the different between distance 433 and height 434 (e.g., the length of the amount of flap 430 remaining to slide within pouch 400). In some embodiments, rigid element 438 can be placed at the limit of height 434 to provide guidance as to how far flap 430 should be inserted.

Figure 8:
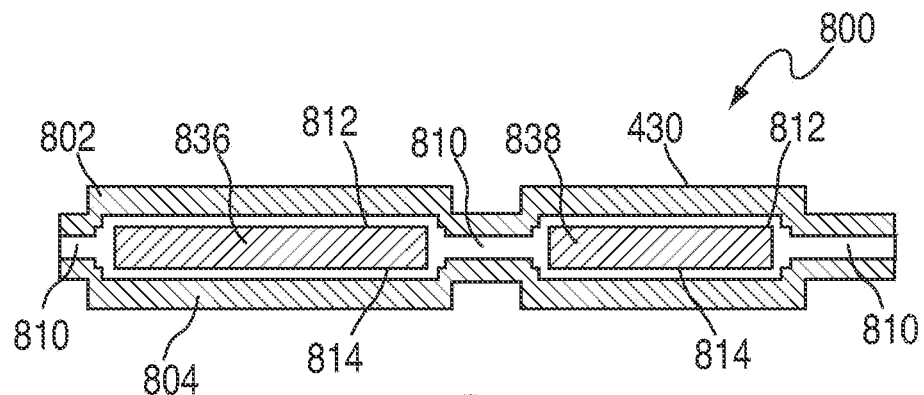
FIG. 8 is a cross-sectional view of the flap of the pouch of FIG. 4 along line 8-8 in accordance with one embodiment of the invention.

Rigid elements 436 and 438 can be constructed from any suitable material. In some embodiments, rigid elements 436 and 438 can include polycarbonate layers providing a that are flexible for bending around an axis in the plane of the layers, but stiff and resisting bending around an axis that is not in the plane of the layers (e.g., perpendicular to the plane of the layers). FIG. 8 is a cross-sectional view of the flap of the pouch of FIG. 4 along line 8-8 in accordance with one embodiment of the invention. The cross-section 800 of flap 430 can include several materials. Layers 802 and 804 can form the outermost surfaces of flap 430. Because at least one of layers 802 and 804 will be in contact with the electronic device when it is in the pouch (e.g., layer 804), the material selected for these layers can be soft so as not to scratch the device shell. In one implementation, layer 802 and 804 can be constructed from microfiber (e.g., polyester microfiber). Although the example of FIG. 8 shows layers 802 and 804 being constructed from the same material, different materials can instead be used. In one implementation, at least one of layers 802 and 804 (e.g., layer 802) can be the extension of a layer of periphery stack 420 (e.g., a layer coming into contact with the electronic device in other portions of pouch 400), and therefore also a soft layer.

Layers 802 and 804 can be coupled to each other using any suitable approach, including for example using an adhesive. In the example of FIG. 8, flap 430 can include adhesive layer 810 extending between layers 802 and 804. Any suitable adhesive can be used, including for example a polyurethane based pressure adhesive. Flap 430 can include rigid elements 836 and 838, corresponding to rigid elements 436 and 438 (FIG. 4). Rigid elements 836 and 838 can be constructed from any suitable material having sufficient stiffness or rigidity. In one implementation, rigid elements 836 and 838 can be constructed form a fiberglass component (e.g., a fiberglass board). To ensure that rigid elements 836 and 838 bond to layers 802 and 804, flap 430 can include additional adhesive layers 812 and 814 applied to the surfaces of the rigid elements.

Returning to FIG. 4, pouch 400 defines an enclosure for the electronic device by binding base layer stack 410 to periphery stack 420. Periphery stack 420 can define a surface having opening 422 through which a user can interact with device 500. Opening 422 can be empty, or alternatively can be filled by a transparent or translucent component that retains the user's ability to interact with the device. Periphery portion 424 of periphery stack 424 can define a substantially continuous surface for retaining the edges (e.g., the periphery) of device 500. Periphery portion 424 can have any suitable width (e.g., width 425) adequate for retaining device 500. In particular, width 425 can be selected such that device 500 cannot be removed from pouch 400 through opening 422, but not so large as to adversely affect a user's interaction with the device interface. Although width 425 is shown to be constant in pouch 400, it will be understood that in some embodiments, width 425 can vary.

When device 500 is inserted into pouch 400, the small width 425 of periphery stack 420 can cause the periphery portion to flare out, and adversely affect the cosmetic appeal and use of the case. To ensure that periphery stack 420 remains in contact with the device enclosure, periphery stack 420 can include rigid ring 426 within periphery portion 424 and defining a continuous or substantially continuous ring around opening 422. Ring 426 can prevent periphery portion 424 from flaring out (e.g., stretching away from the device enclosure) and instead maintain the surface of the device having the display in contact with the pouch.

Figure 9:
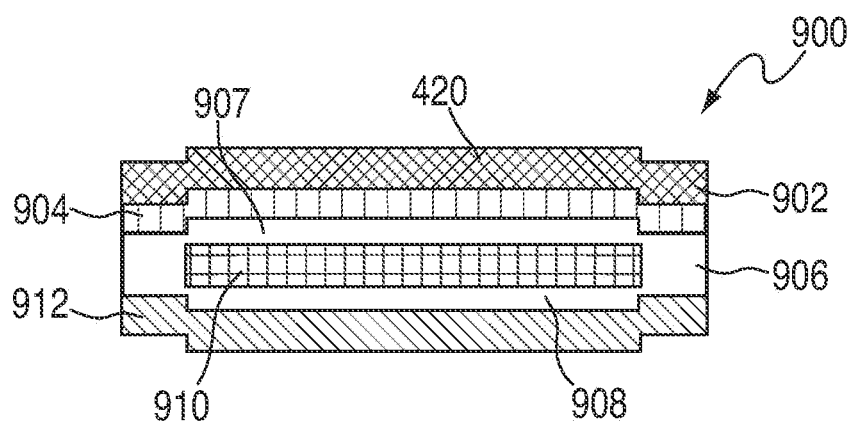
FIG. 9 is a cross-sectional view of periphery stack 420 taken along line 9-9 in accordance with one embodiment of the invention.

Rigid ring 426 can be embedded within periphery stack 420 using any suitable approach. FIG. 9 is a cross-sectional view of periphery stack 420 taken along line 9-9 in accordance with one embodiment of the invention. Cross-section 900 of periphery stack 420 can include several layers having different physical properties combining to provide a particular cosmetic and physical effect. On its outermost surface, periphery stack 420 can include external layer 902. Layer 902 can include any suitable property, including for example an aesthetically pleasing surface, a surface that is comfortable to the touch, resistant to stains, tears, or other damage, or has any other property. In one implementation, layer 902 can be constructed from polyurethane. Because polyurethane is stretchable, periphery stack 420 can include layer 904 for resisting the deformation by stretching of layer 902. For example, layer 904 can include a polyester knit that resists to tension along the plane of the knit. Layer 904 can be bonded to layer 902 using any suitable approach, including for example using an adhesive layer (not shown), but pressure, or any other suitable approach. In some embodiments, an adhesive layer on the other side of layer 904 (e.g., adhesive layer 907) can traverse layer 804 (because it is knit) and ensure that layer 904 bonds to layer 902.

To form the rigid ring around the periphery of periphery stack 420, cross-section 900 can include rigid layer 910. Rigid layer 910 can be constructed from any suitable material, including for example fiberglass (e.g., as described above in connection with ring 426, FIG. 4). To ensure a proper bond between layer 910 and the remaining layers, adhesive layers 906, 907 and 908 can be applied around rigid layer 910 (e.g., adhesive layers 907 and 908 on the top and bottom surfaces of layer 910, and layer 906 between layers 904 and 912 where there is no rigid layer 910). Layers 906, 907 and 908 can be formed using any suitable adhesive, including for example a pressure or heat adhesive (e.g., a polyurethane based adhesive).

The last layer of periphery stack 420 is placed in contact with electronic device enclosure. Accordingly, layer 912 can be constructed from a soft material that will not damage the enclosure. Such materials can include, for example, a microfiber (e.g., polyester microfiber). Stack 420 can be assembled in any suitable manner. In some embodiments, each layer can be individually added and adhered or integrated in the stack in sequence. Alternatively, some or all of the layers can be overlaid, and a pressure or heat-based process can be applied to assemble the stack. The individual layers can be pre-cut and assembled, or alternatively can be assembled and once the stack crated, cut to a particular shape (e.g., die cut).

Figure 10:
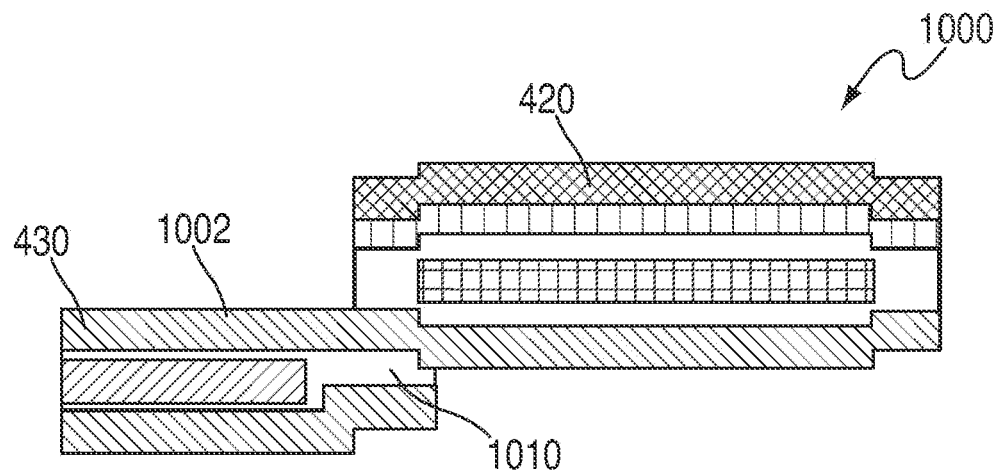
FIG. 10 is a cross-sectional view of the tab and periphery stack of the pouch of FIG. 4 taken along line 10-10 in accordance with one embodiment of the invention.

In some embodiments, flap 430 can include at least one layer that is shared with periphery stack 420. FIG. 10 is a cross-sectional view of the tab and periphery stack of the pouch of FIG. 4 taken along line 10-10 in accordance with one embodiment of the invention. Cross-section 1000 of periphery stack 420 and flap 430 can include the distinct layers of each of stack 420 and flap 430, as described above in connection with FIGS. 8 and 9. To ensure that the stack and flap are properly integrated, layer 1002 can be used simultaneously as both layer 912 of periphery stack 420 (FIG. 9) and layer 804 of flap 430 (FIG. 8). Adhesive layer 1010, which can correspond to adhesive layer 810 of flap 430 (FIG. 8), can extend at least partially underneath periphery stack 420 along with layer 820 of flap 430 (FIG. 8).

Device 500 can include several ports for interface with the electronic device. For example, device 500 can include one or more buttons or other control means (e.g., a sliding mechanisms), connectors (e.g., USB or 30-pin connectors, or a jack), speakers, sensors (e.g., proximity or IR sensors) or other interface elements that a user may need to access through pouch 400. For example, pouch 400 can include connector opening 452, button openings 452 and 454, wheel opening 456, and speaker openings 458. Although the openings in pouch 400 were characterized, it will be understood that these openings could be used for any other interface element, and that one opening could be used for several interface elements.

Opening 450 can be formed in any suitable element of the case. In the example of FIG. 4, opening 450 has been made in flap 430. Opening 450 can have any suitable size or use, including for example positioned and sized to let a connector pass through and engage a corresponding interface of device 500. Opening 450 can be manufactured using any suitable approach, including for example die cutting before or after the assembly of flap 430. Openings 452, 454 and 456 can have any suitable size or use, including for example a position and size corresponding to buttons or other interfaces for actuating device 500. Because openings 452, 454, and 456 can be relatively large (e.g., large enough to allow a user's finger to pass), the portions of periphery stack 420 near or around the openings can flare out when device 500 is inserted. To prevent the flare out, periphery stack 420 or back layer stack 410 (e.g., the stack having the openings) can include a stiffening layer that maintains the integrity and shape of the opening. For example, the stacks can include a supplemental polycarbonate layer (e.g., a polycarbonate disk around the edges of the openings) and corresponding adhesive layers in the layer stack (e.g., an additional polycarbonate layer instead of or adjacent to the rigid layer).

Openings 458 can include several holes through which audio waves can propagate. To ensure optical audio propagation, openings 458 can be substantially aligned with corresponding openings adjacent to a speaker of device 500. Openings 458 can have any suitable size, including for example a larger number of small openings or a smaller number (e.g., one) of larger openings. When smaller openings are used, periphery stack 420 may be less prone to flaring out, as there is less material absent and therefore force is more evenly distributed. To ensure that the shape of pouch 400 remains intact, periphery stack 420 can include an additional layer of material (e.g., a softer material, such as an additional layer of microfiber or polyurethane).

Figure 11:
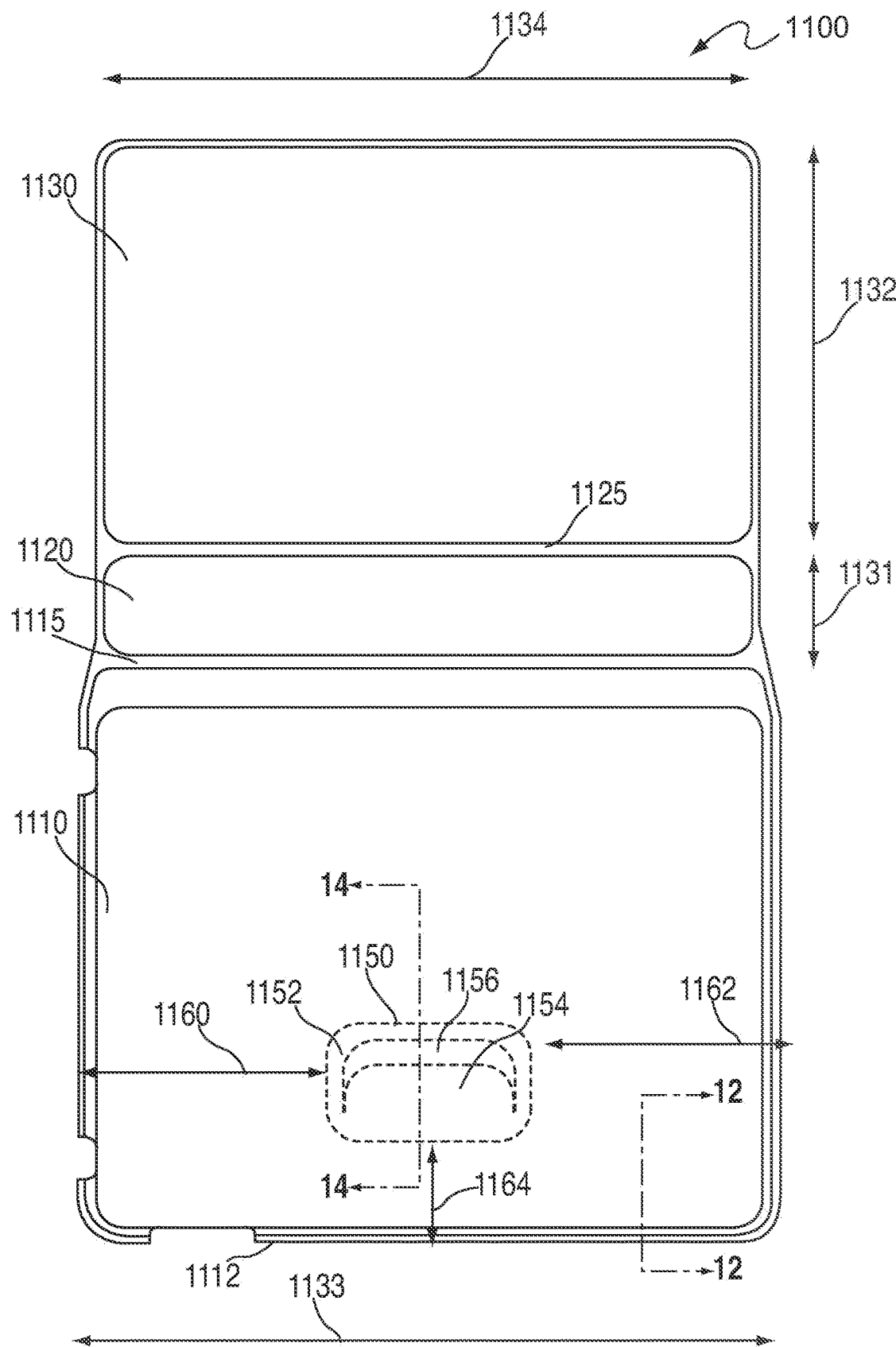
FIG. 11 is a schematic view of a base stack in accordance with one embodiment of the invention.

Back layer stack 410 can include a substantially continuous surface to be placed in contact with a side of the device enclosure. For example, a side of the device opposite the display can be placed in contact with back layer stack 410. In some embodiments, back layer stack 410 can extend beyond the edges of periphery stack 420 and include some or all of a hinge and cover of the case. FIG. 11 is a schematic view of a base stack in accordance with one embodiment of the invention. Stack 1100 can include several distinct portions, including for example pouch portion 1110, hinge portion 1120, and cover portion 1130 all within the same piece of material. In particular, stack 1100 can be manufactured from at least one layer of material sized to include the pouch, hinge and cover portions.

Stack 1100 can distinguish the different portions of the stack using any suitable approach. In some embodiments, stack 1100 can include sections of harder material defining boundaries for the different portions. For example, stack 1100 can include hard element 1112 of pouch portion 1100, hard element 1122 of hinge portion 1120, and hard element 1132 of cover portion 1130. The hard elements can have any suitable size, including for example elements that extend almost or substantially to the side boundaries of the stack. The space between the hard elements (e.g., space 1115 and space 1125) can include softer material such that the different hard elements can fold at least partially over each other along spaces 1115 and 1125. The hard elements can be constructed from any suitable material including for example rigid layers (e.g., polycarbonate layers) providing a that are flexible for bending around an axis in the plane of the layers, but stiff and resisting bending around an axis that is not in the plane of the layers (e.g., perpendicular to the plane of the layers).

Each of pouch portion 1110, hinge portion 1120 and cover portion 1130 can have any suitable size. For example, pouch portion 1100 can have substantially the same size as the periphery pouch (e.g., periphery pouch 420, FIG. 4). In particular, the size of pouch portion 1100 can be selected based on the expected size of an electronic device to be placed within the pouch (e.g., width 1130 corresponds to a dimension of the device). Hinge portion 1120 can have any suitable width 1131. For example, width 1131 can be selected to substantially match the thickness of the device plus the thickness of the periphery stack, such that cover portion 1130 can fold over the device and lie directing on the device display. In particular, spaces 1115 and 1125 can be distributed to ensure that cover portion 1130 can fold over the device and remain in place over the device while protecting the entire device (e.g., the cover portion does not remain partially open, and the portion of cover portion 1130 adjacent to space 1125 is substantially in contact with the device).

Cover portion 1130 can have any suitable length 1132 and width 1134. In particular, length 1132 can be selected so that cover portion 1130 can at least cover a portion along the entire periphery of the periphery stack of the case (e.g., at least cover the ring of the periphery stack). Width 1134 can be selected such that it is less than or equal to width 1133 of the pouch portion. In some embodiments, width 1134 can be selected to be less than width 1133, but at least enough to cover at least a portion along the entire periphery of the periphery stack of the case (e.g., at least cover the ring of the periphery stack). Width 1134 can be distributed within width 1133 in any suitable manner, including for example off-centered (e.g., such that the distance between the each side edge of the cover portion and the side edge of the corresponding pouch portion are different). In some embodiments, cover portion 1130 can include a fastening mechanism for retaining the cover over the periphery stack. The fastening mechanism can include, for example, a mechanical snap, a magnetic snap, hook and fastener material, or any other suitable fastening mechanism.

FIG. 12 is a cross-sectional view of base layer stack 1110 taken along line 12-12 and connected to a peripheral layer stack in accordance with one embodiment of the invention. Cross-section 1200 of base layer stack 1100 can include several layers constructed from different materials. In particular, base layer stack 1100 can include internal layer 1202 put in contact with the electronic device enclosure (e.g., electronic device 500). To prevent damage to the device, layer 1202 can be constructed from a soft material. Such materials can include, for example, a microfiber (e.g., polyester microfiber).

Layer 1202 can be coupled to rigid layer 1208 (e.g., a polycarbonate layer) by adhesive layer 1204. In some embodiments, layer 1208 can extend through only portions of stack 1200 (e.g., the portions of the base layer stack that include rigid elements). To ensure a proper bond between layer 1208 and the remaining layers, adhesive layers 1204, 1205 and 1206 can be applied around layer 1208 (e.g., adhesive layers 1204 and 1206 on the top and bottom surfaces of layer 1208, and layer 1205 between layers 1202 and 1210 where there is no rigid layer 1208). Layers 1204, 1205 and 1206 can be formed using any suitable adhesive, including for example a pressure or heat-sensitive adhesive (e.g., a polyurethane based adhesive).

On its outermost surface, base layer stack 1200 can include external layer 1212. Layer 1212 can include any suitable property, including for example an aesthetically pleasing surface, a surface that is comfortable to the touch, resistant to stains, tears, or other damage, or has any other property. In one implementation, layer 1212 can be constructed from polyurethane. Because polyurethane is stretchable, stack 1100 can include layer 1210 for resisting the deformation by stretching of layer 1212. For example, layer 1210 can include a polyester knit that resists to tension along the plane of the knit. Layer 1210 can be bonded to layer 1212 using any suitable approach, including for example using an adhesive layer (not shown), but pressure, or any other suitable approach. In some embodiments, an adhesive layer on the other side of layer 1210 (e.g., adhesive layer 1206) can traverse layer 1210 (because it is knit) and ensure that layer 1210 bonds to layer 1212.

Stack 1200 can be assembled in any suitable manner. In some embodiments, each layer can be individually added and adhered or integrated in the stack in sequence. Alternatively, some or all of the layers can be overlaid, and a pressure or heat-based process can be applied to assemble the stack. The individual layers can be pre-cut and assembled, or alternatively can be assembled and once the stack crated, cut to a particular shape (e.g., die cut).

Base layer stack 1100 can be coupled to periphery stack 420 using any suitable approach. In some embodiments, adhesive layer 1220 can be placed between base layer stack 1100 and periphery stack 420 such that the edges of the stacks are connected. In some embodiments, individual layers of each stack can be visible along the edge of the case (e.g., knit layer 1210 and the corresponding knit layer of periphery stack 420 can be visible). In some embodiments, or one or more layers of each stack can stop before reaching the edge of the stack (e.g., similar to the fiberglass and polycarbonate layers, described above). For example, layer 1202 and its counterpart in the periphery stack (e.g., microfiber layers) can not extend to the edge of the stacks such that the adhesive layers of each stack (e.g., adhesive layer 1205) can be used to couple base layer stack 1100 to periphery stack 420.

In some embodiments, base layer stack 1100 can include tab 1150 coupled to the back surface of the stack (e.g., the surface opposite the periphery stack, or the surface that is not placed in contact with the device). Tab 1150 can be positioned at any suitable distance from edges of base layer stack 1100. For example, tab 1150 can be equidistant from the side edges of base layer stack 1100 (e.g., the sides that include the sides of cover portion 1130), such that distances 1160 and 1162 are the same. In some embodiments, distances 1160 and 1162 can be different, for example based on characteristics of pouch portion 1110 or cover 1130 (e.g., the placement of rigid elements, openings in the cover or pouch, or other physical attributes of the stack). Although only one tab 1150 is shown in FIG. 11, base layer stack 1100 can include several tabs distributed along the stack (e.g., distributed based on corresponding elements of the cover portion).

Tab 1150 can be positioned at any suitable distance from bottom edge 1112 of pouch portion 1110. In particular, distance 1164 can be selected, along with width 1131 and length 1132 such that cover portion 1130 can be folded back over pouch portion 1110 and the edge of the cover portion inserted into tab 1150. This can form a triangular prism that a user can place on hinge portion 1120 or on pouch portion 1130. FIGS. 13A and 13B are end views of a folded over case defining a prism in accordance with one embodiment of the invention. Case 1300 can include pouch portion 1310, hinge portion 1320, and cover portion 1330. Cover portion 1330 can be folded over pouch portion 1310 such that cover portion 1330 can be engaged in tab 1350. Case 1300 can then define a prism-type shape by which the internal surface of pouch portion 1310 (e.g., the surface of pouch portion 1310 through which a device interface can be accessed) is exposed on an outer surface of the prism.

Tab 1350 can be placed on the back surface of pouch portion 1310 at any suitable position, including for example a position such that the prism defines angle 1352 between pouch portion 1310 and cover portion 1330, and angle 1354 between pouch portion 1310 and hinge portion 1320. Each angle 1352 and 1354 can be selected based on any criteria, including for example desired angles for performing particular operations with the device. In one implementation, angle 1352 can be selected such that a user can easily type on an interface of the device. In another implementation, angle 1354 can be selected so that the user can view content (e.g., media) displayed by the device.

Figure 14:
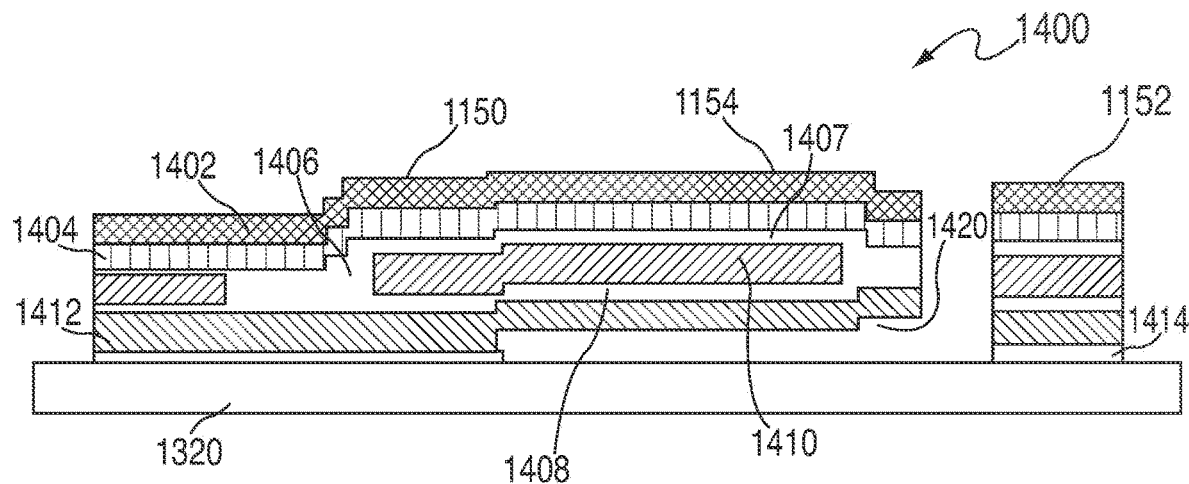
FIG. 14 is a cross-sectional view of tab 1150 taken along line 14-14 in accordance with one embodiment of the invention.

Returning to FIG. 11, tab 1150 can be constructed using any suitable approach. In some embodiments, tab 1150 can be a component added to the surface of base layer stack 1100. Tab 1150 can include periphery 1152 defining the structure of tab 1150 and enclosing an area of the tab. Tab element 1154 can extend from a side of periphery 1152 such that the cover can engage tab element 1154. Tab element 1154 can be offset from the surface of base layer plate 1100 by gap 1156, which can extend within the area defined by periphery 1152. FIG. 14 is a cross-sectional view of tab 1150 taken along line 14-14 in accordance with one embodiment of the invention. Cross-section 1400 of tab 1150 can include several layers constructed from different materials. In particular, cross-section 1400 can include softer materials to be placed in contact with the cover, and harder materials to ensure that the tab can retain the cover. In particular, tab 1150 can include outermost layer 1402. Layer 1402 can include any suitable property, including for example an aesthetically pleasing surface, a surface that is comfortable to the touch, resistant to stains, tears, or other damage, or has any other property. In one implementation, layer 1402 can be constructed from polyurethane. Because polyurethane is stretchable, tab 1150 can include layer 1404 for resisting the deformation by stretching of layer 1402. For example, layer 1404 can include a polyester knit that resists to tension along the plane of the knit. Layer 1404 can be bonded to layer 1402 using any suitable approach, including for example using an adhesive layer (not shown), but pressure, or any other suitable approach. In some embodiments, an adhesive layer on the other side of layer 1404 (e.g., adhesive layer 1406 or 1407) can traverse layer 1404 (because it is knit) and ensure that layer 1404 bonds to layer 1402.

To provide stiffness to tab 1150 so that the tab can retain the cover when it is inserted in the tab, tab 1150 can include rigid layer 1410 (e.g., a polycarbonate layer) coupled to the other layers by adhesive layer 1406. In some embodiments, layer 1410 can extend through only portions of tab 1150 (e.g., the portions of the tab that include rigid elements, such as tab element 1154 and periphery 1152). To ensure a proper bond between layer 1410 and the remaining layers, adhesive layers 1406, 1407 and 1408 can be applied around layer 1410 (e.g., adhesive layers 1407 and 1408 on the top and bottom surfaces of layer 1410, and layer 1406 between layers 1404 and 1412 where there is no rigid layer 1410). Layers 1406, 1407 and 1408 can be formed using any suitable adhesive, including for example a pressure or heat-sensitive adhesive (e.g., a polyurethane based adhesive).

Tab 1150 can include internal layer 1412 that the cover can contact when it is folded into tab 1150. To prevent damage to the cover, layer 1412 can be constructed from a soft material. Such materials can include, for example, a microfiber (e.g., polyester microfiber). Tab 1150 can then coupled to pouch portion 1320 using adhesive layer 1414.

Tab 1150 can be assembled in any suitable manner. In some embodiments, each layer can be individually added and adhered or integrated in the stack in sequence. Alternatively, some or all of the layers can be overlaid, and a pressure or heat-based process can be applied to assemble the stack. The individual layers can be pre-cut and assembled, or alternatively can be assembled and once the stack crated, cut to a particular shape (e.g., die cut).

Figure 15:
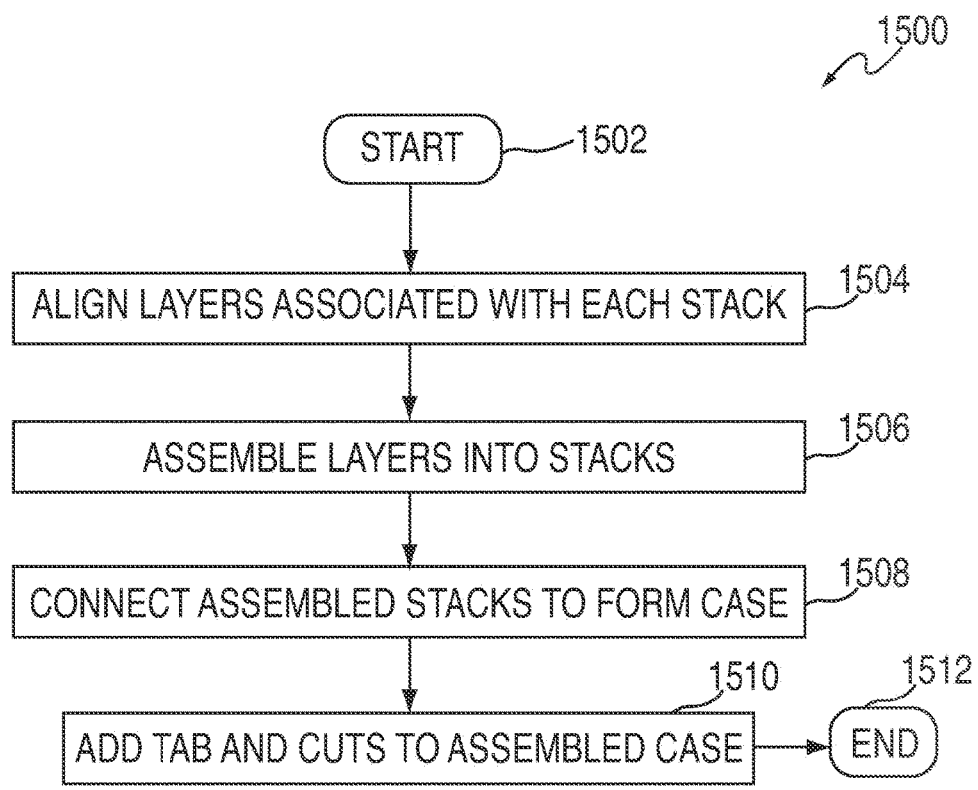
FIG. 15 is a flowchart of an illustrative process for assembling a case for protecting an electronic device in accordance with one embodiment of the invention.

FIG. 15 is a flowchart of an illustrative process for assembling a case for protecting an electronic device in accordance with one embodiment of the invention. Process 1500 can begin at step 1502. At step 1504, the individual layers forming each stack of the case can be aligned. For example, each layer can be cut and aligned relative to the other layers. As another example, sheets of material can be overlaid with layers that do not extend through the entire stack (e.g., rigid layers such as polycarbonate layers or fiberglass layers). At step 1506, the aligned layers can be assembled into stacks. The layers can be assembled using any suitable approach, including for example using heat and/or pressure-based processes or adhesive. In some embodiments, one or more cuts can be applied to the assembled stacks to provide openings for interfaces of a device to be placed in the case.

At step 1508, the assembled stacks can be connected to form a case. For example, one or more layers of adhesive can be placed between the stacks to secure the stacks. As another example, a heat or pressure based process can be used to connect the assembled stacks. At step 1510, the tab can be connected to the case (e.g., to the back of the base layer stack), and various cuts or other finishing processes can be performed. For example, the tab can be assembled to the stack via an adhesive, and the cuts in the flap or other portions of the periphery stack can be performed to allow access to device interface elements. In some embodiments, the external surfaces of the case can be finished (e.g., provide a stain resistance coating). In some embodiments, the edges of the case can be refined if necessary. Process 1500 can then end at step 1512.

The previously described embodiments are presented for purposes of illustration and not of limitation. It is understood that one or more features of an embodiment can be combined with one or more features of another embodiment to provide systems and/or methods without deviating from the spirit and scope of the invention. The present invention is limited only by the claims which follow.

What is claimed is:

1. A protective case for a portable electronic device, the protective case comprising:
   a pouch element configured to carry the portable electronic device, the pouch element comprising:
      a first end defining an opening through which the portable electronic device is inserted into the pouch element,
      a second end opposite the first end, and
      a back layer positioned between the first end and the second end; and
   a flap coupled to the pouch element at the first end, the flap comprising:
      a first element, and
      a second element positioned between the first element and the pouch element, the second element rotationally coupled to the pouch element and the first element, wherein:
   in a closed configuration, the first element is folded into the opening of the pouch element in a first support configuration, the first element and the second element support the back layer such that the pouch element is inclined at a first angle, and
   in a second support configuration, the first element and the second element support the back layer such that the pouch element is inclined at a second angle that is different from the first angle.

2. The protective case as recited in claim 1, wherein the back layer that defines a continuous surface.

3. The protective case as recited in claim 1, wherein the second element is configured to cooperate with the pouch element to retain the portable electronic device in the closed configuration.

4. The protective case as recited in claim 1, wherein the pouch element includes an external layer comprising polyurethane, a polyester knit layer adjacent the external layer, and a rigid layer bonded to the polyester knit layer by an adhesive and comprising fiberglass or polycarbonate.

5. The protective case as recited in claim 1, further comprising a cover, wherein the flap is separate from the cover.

6. A protective case for a portable electronic device, the protective case comprising:
   a pouch element configured to receive the portable electronic device, the pouch element being characterized as having a first edge and a second edge opposite the first edge, the pouch element defining an opening that is closer to the first edge than the second edge, the pouch element comprising:
      an external layer comprising polyurethane,
      a polyester knit layer adjacent the external layer, and
      a rigid layer bonded to the polyester knit layer by an adhesive, the rigid layer comprising fiberglass or polycarbonate;
   a cover connected to the pouch element at the first edge, wherein the cover is configured to provide multiple support structures for the pouch element; and
   a flap separate from the cover and connected to the pouch element at the first edge, wherein a closed configuration comprises the flap inserted into the opening and covering the electronic device when the electronic device is in the pouch element.

7. The protective case as recited in claim 6, wherein the flap comprises one or more rigid elements.

8. The protective case as recited in claim 6, wherein the cover is a flexible and includes a microfiber material.

9. The protective case as recited in claim 6, wherein the pouch element further comprises a second opening that allows for user interface with a display of the portable electronic device when the portable electronic device is positioned in the pouch element.

10. The protective case as recited in claim 6, wherein:
   in a first support configuration, the cover supports the pouch element at a first angle, and
   in a second support configuration, the cover supports the pouch element at a second angle that is different from the first angle.

11. A protective case for a portable electronic device, the protective case comprising:
   a pouch element comprising a first end and a second end opposite the first end, the pouch element defining an opening configured to receive the portable electronic device; and
   a foldable flap comprising a first element and a second element positioned between the first element and the pouch element, the second element rotationally coupled to the pouch element at the first end, wherein:
   in a first closed configuration, the foldable flap covers a display of the portable electronic device,
   in a second closed configuration, the first element is positioned in the opening, and
   in a support configuration, the foldable flap is folded behind the pouch element and forms a triangular support for the pouch element.

12. The protective case as recited in claim 11, wherein the triangular support is capable of including the pouch element at a first angle and at a second angle, the first angle being different than the second angle.

13. The protective case as recited in claim 11, wherein the first element comprises a fastening mechanism for retaining the first element over the pouch element in the support configuration.

14. The protective case as recited in claim 13, wherein the fastening mechanism comprises a mechanical snap, a magnet, or a hook and fastener material.

15. The protective case as recited in claim 11, wherein the first element is larger than the second element.

16. The protective case as recited in claim 11, wherein the pouch element includes an external layer comprising polyurethane, a polyester knit layer adjacent the external layer, and a rigid layer bonded to the polyester knit layer by an adhesive and comprising fiberglass or polycarbonate.

17. The protective case as recited in claim 11, wherein the pouch element comprises:
   a stack comprising one or more layers of material.

18. The protective case as recited in claim 17, wherein the opening comprises a size and shape to receive the flap.

\* \* \* \* \*

UNITED STATES PATENT AND TRADEMARK OFFICE
CERTIFICATE OF CORRECTION

PATENT NO.        : 10,591,956 B2
APPLICATION NO.   : 15/694094
DATED             : March 17, 2020
INVENTOR(S)       : Matthew D. Rohrbach et al.

It is certified that error appears in the above-identified patent and that said Letters Patent is hereby corrected as shown below:

In the Specification

At Column 12, Line 36-37: "Tab 1150 can then coupled to pouch portion 1320 using adhesive layer 1414." should read -- Tab 1150 can then be coupled to pouch portion 1320 using adhesive layer 1414. --.

Signed and Sealed this
Seventeenth Day of May, 2022

Katherine Kelly Vidal
*Director of the United States Patent and Trademark Office*